(12) United States Patent
Cheng et al.

(10) Patent No.: US 10,953,804 B2
(45) Date of Patent: Mar. 23, 2021

(54) VEHICLE REAR VIEW DEVICE AND VEHICLE

(71) Applicant: BOE Technology Group Co., Ltd., Beijing (CN)

(72) Inventors: Xinyi Cheng, Beijing (CN); Changlin Leng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 173 days.

(21) Appl. No.: 16/146,561

(22) Filed: Sep. 28, 2018

(65) Prior Publication Data

US 2019/0299866 A1    Oct. 3, 2019

(30) Foreign Application Priority Data

Mar. 30, 2018 (CN) ..................... 2018 2 0480137 U

(51) Int. Cl.
  *H01Q 1/32*    (2006.01)
  *B60R 1/12*    (2006.01)
  *B60R 1/04*    (2006.01)

(52) U.S. Cl.
  CPC .................. *B60R 1/12* (2013.01); *B60R 1/04* (2013.01); *H01Q 1/3266* (2013.01); *B60R 2001/1261* (2013.01)

(58) Field of Classification Search
  CPC .... B60R 2001/1261; B60R 1/04; H01Q 1/32; B06R 1/12
  See application file for complete search history.

(56) References Cited

U.S. PATENT DOCUMENTS

| | | | | |
|---|---|---|---|---|
| 5,798,688 A | * | 8/1998 | Schofield | ................ B60R 1/086 340/438 |
| 6,011,518 A | * | 1/2000 | Yamagishi | ........... H01Q 1/3266 343/700 MS |
| 6,078,294 A | * | 6/2000 | Mitarai | ................ H01Q 1/3266 343/700 MS |
| 6,081,237 A | * | 6/2000 | Sato | .......................... B60R 1/12 343/700 MS |
| 6,431,712 B1 | * | 8/2002 | Turnbull | ................... B60R 1/12 359/265 |
| 2002/0126054 A1 | * | 9/2002 | Fuerst | ................. B60C 23/0444 343/712 |

(Continued)

FOREIGN PATENT DOCUMENTS

| CN | 101682107 A | 3/2010 |
|---|---|---|
| CN | 204732539 U | 10/2015 |

(Continued)

*Primary Examiner* — Hasan Z Islam
(74) *Attorney, Agent, or Firm* — Nath, Goldberg & Meyer; Joshua B. Goldberg

(57) ABSTRACT

The present disclosure provides a vehicle rear view device comprising: a shell; a rear view mirror forming an accommodation space between the shell and the rear view mirror; and a wireless communication device comprising a communication circuit board and a communication antenna. The communication circuit board is located in the accommodation space, the communication antenna is disposed in m antenna placement area of the shell, the communication antenna is disposed separately from the communication circuit board, md the communication antenna and the communication circuit board are electrically connected.

12 Claims, 1 Drawing Sheet

(56) References Cited

U.S. PATENT DOCUMENTS

2004/0246607 A1* 12/2004 Watson .................... B60R 1/12
359/872
2020/0127381 A1* 4/2020 Sone ....................... H01Q 1/48

FOREIGN PATENT DOCUMENTS

CN 105024151 A 11/2015
EP 0860325 A2 8/1998

* cited by examiner

VEHICLE REAR VIEW DEVICE AND VEHICLE

CROSS-REFERENCE TO RELATED APPLICATION

This application claims the priority of China Patent Application No. 201820480137.5, filed in China on Mar. 30, 2018, the entire contents of which are hereby incorporated by reference.

TECHNICAL FIELD

The present disclosure relates to the field of antenna technology, and in particular to a vehicle rear view device and a vehicle.

BACKGROUND

The vehicle rear view device is an essential part of the vehicle. With the development of the vehicle intelligence, the vehicle rear view device is gradually improved in functions from the original simple rear view function.

For example, the vehicle rear view device can integrate with a communication module such as a Bluetooth module or a Global Positioning System (GPS) module and the like.

SUMMARY

The embodiments of the present disclosure provide the following technical solutions:

An aspect of the present disclosure is to provide a vehicle rear view device comprising: a shell; a rear view mirror, and an accommodation space is formed between the shell and the rear view mirror; and a wireless communication device comprising a communication circuit board and a communication antenna; wherein the communication circuit board is located in the accommodation space, the communication antenna is disposed in an antenna placement area of the shell, the communication antenna is disposed separately from the communication circuit board, and the communication antenna and the communication circuit board are electrically connected.

The objects of the embodiments of the present disclosure and the technical problems can be further implemented by the following technical means.

In an aspect of the present disclosure, the shape of the communication antenna matches the shape of the antenna placement area of the shell.

In an aspect of the present disclosure, the communication antenna is a flexible antenna, and the flexible antenna is attached to the antenna placement area.

In an aspect of the present disclosure, the flexible antenna is a flexible PCB microstrip antenna.

In an aspect of the present disclosure, the antenna placement area comprises an antenna embedding space located within a shell wall of the shell, and the communication antenna is partially or wholly embedded in the antenna embedding space.

In an aspect of the present disclosure, the shell and the communication antenna are integrally formed.

In an aspect of the present disclosure, the shell is detachably coupled to the rear view mirror in a snap-fit manner.

In an aspect of the present disclosure, the communication circuit board is disposed on the rear view mirror.

In an aspect of the present disclosure, the rear view mirror is provided with a first docking end, the first docking end is electrically connected to the communication circuit board, and the shell is provided with a second docking end, the second docking end is electrically connected to the communication antenna; the first docking end connects with the second docking end when the shell is coupled to the rear view mirror in a snap-fit manner; and the first docking end is separated from the second docking end when the shell is separated from the rear view mirror.

In an aspect of the present disclosure, the communication antenna is selected from a group consisting of: a satellite antenna, a cellular network antenna, a millimeter wave radar antenna, an FM broadcast antenna, a WiFi antenna, and a Bluetooth antenna.

In an aspect of the present disclosure, the antenna placement area comprises a first end placement area and a second end placement area at two opposite ends of the shell in a length direction of the shell; and the communication antenna comprises the satellite antenna and the cellular network antenna, the satellite antenna is disposed in the first end placement area, and the cellular network antenna is disposed in the second end placement area.

In an aspect of the present disclosure, the antenna placement area further comprises a central placement area, the central placement area is located between the first end placement area and the second end placement area; the communication antenna further comprises at least one of the millimeter wave radar antenna and an the FM broadcast antenna, and the at least one of the millimeter wave radar antenna and the FM broadcast antenna is disposed in the central placement area.

In an aspect of the present disclosure, the communication antenna further comprises at least one of the WiFi antenna and the Bluetooth antenna, and the at least one of the WiFi antenna and the Bluetooth antenna is disposed in the second end placement area.

Another aspect of the present disclosure is to provide a vehicle comprising the vehicle rear view device described above.

The above description is only an overview of the technical solutions of the present disclosure. In order to more clearly understand the technical means in the embodiments of the present disclosure, and to implement them in accordance with the contents of the specification, the following detailed description of the preferred embodiments of the present disclosure in conjunction with the accompanying drawings will be described below.

BRIEF DESCRIPTION OF THE DRAWINGS

Various advantages and benefits will become apparent to those skilled in the art by reading the detailed description of the preferred embodiments below. The drawings are intended to illustrate preferred embodiments and are not to be considered as a limitation to the present disclosure. Throughout the drawings, the same components are denoted by the same reference numerals. In the drawing.

DETAILED DESCRIPTION OF THE EMBODIMENTS

To further explain the technical means for achieving the intended purpose and effects of the present disclosure, the specific embodiments, structures, features and effects of the vehicle rear view device and the vehicle according to the embodiments of the present disclosure will be further described below in conjunction with the accompanying drawings and alternative embodiments in details. In the following description, 'one embodiment' or 'an embodiment' in different paragraphs does not necessarily mean the same embodiment. Furthermore, the particular features, structures, or characteristics in one or more embodiments can be combined in any suitable form.

A vehicle rear view device is provided in this embodiment. A communication antenna is disposed on an antenna placement area on a shell of the vehicle rear view device. It is not necessary to dispose additional antenna line inside the vehicle. The communication antenna is disposed separately from the communication circuit board, which can improve the heat dissipation of the communication circuit board, and reduce the electromagnetic interference caused by the communication antenna to the communication circuit board.

Figure 1:
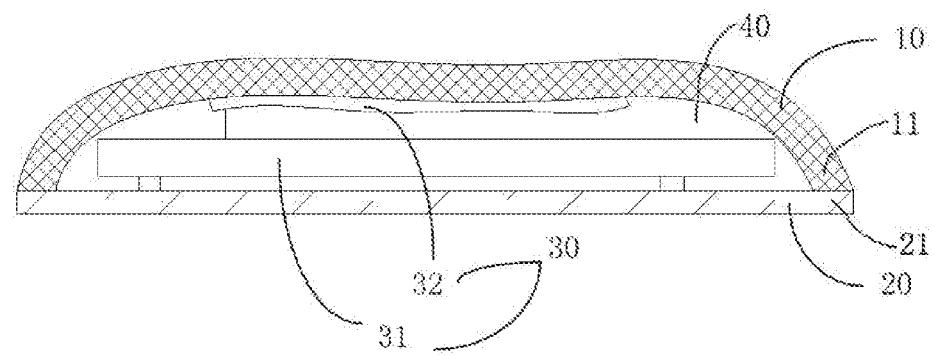
FIG. 1 is a cross-sectional structural view of a vehicle rear view device according to an embodiment of the present disclosure.

FIG. 1 is an embodiment of a vehicle rear view device provided in the present disclosure. Referring to FIG. 1, the vehicle rear view device according to an embodiment of the present disclosure includes a shell 10, a rear view mirror 20, and a wireless communication device 30.

An accommodation space 40 is formed between the shell 10 and the rear view mirror 20. The wireless communication device 30 includes a communication circuit board 31 and a communication antenna 32. The communication circuit board 31 is located in the accommodation space 40. The communication antenna 32 is disposed separately from the communication circuit board 31, and in an antenna placement area 100 of the shell 10. The communication antenna 32 and the communication circuit board 31 are electrically connected. Here, the 'electrically connected' may be to connect components by wires. The communication circuit board 31 transmits and receives wireless signals through the communication antenna 32.

In the technical solution provided in the embodiment of the present disclosure, the communication antenna 32 is disposed on the antenna placement area 100 on the shell 10, and the communication antenna 32 and the communication circuit board 31 are electrically connected. Therefore, it is not necessary to separately arrange the antenna line in the vehicle as the communication antenna of the vehicle rear view device, and thus the installation operation is convenient. Meanwhile, since the communication antenna 32 of the wireless communication device 30 is disposed separately from the communication circuit board 31, it is not necessary to reserve a position on the communication circuit board for antenna installation, so that the size of the communication circuit board is small. Compared with the case where the communication antenna is arranged on the communication circuit board, the present embodiment can improve the heat dissipation of the communication circuit board, and reduce the electromagnetic interference caused by the communication antenna to the communication circuit board.

The main body of the shell 10 can be made from plastic, and the antenna placement area 100 can be made by using a material such as resin, glass fiber or ceramic, or a polytetrafluoroethylene (PTFE) composite material, so as to serve as a substrate for the communication antenna 32. Optionally, the shell 10 is detachably coupled to the rear view mirror 20 in a snap-fit manner. The detachable arrangement of the shell 10 and the rear view mirror 20 makes it easy to replace parts such as a rear case or feeder (wire). In addition, the shell 10 may also be set to different colors according to different user preferences, and the user can also replace the shell 10 of the vehicle rear view device according to user's preference. Optionally, the communication circuit board 31 is disposed on the rear view mirror 20. When the communication circuit board 31 is assembled and disassembled, the installation and removal operations of the communication circuit board can be simplified by installing or removing the communication circuit board 31 and the rear view mirror 20 together. Optionally, the wireless communication device 30 may include a first docking end and a second docking end; the first docking end is electrically connected to the communication circuit board 31; and the second docking end is electrically connected to the communication antenna 32. The first docking end and the second docking end are detachably connected with each other. The electrical connection between the communication circuit board 31 and the communication antenna 32 is achieved by a connection between the first docking end and the second docking end. The first docking end and the second docking end may be a radio frequency (RF) connector or the like.

Optionally, the rear view mirror 20 is provided with a first docking end 21, and the first docking end 21 is electrically connected to the communication circuit board 31. The shell 10 is provided with a second docking end 11, and the second docking end 11 is electrically connected to the communication antenna 32. When the shell 10 is coupled to the rear view mirror 20 in a snap-fit manner, the first docking end 21 and the second docking end 11 are connected with (attaches to) each other, thus the communication circuit board 31 and the communication antenna 32 are electrically connected. When the shell 10 is separated from the rear view mirror 20, the first docking end 21 and the second docking end 11 are separated from each other, such that an electrical connection between the communication circuit board 31 and the communication antenna 32 is disconnected. Therefore, an instant plug connection can be realized, and the convenience of replacing the shell can be improved.

The rear view mirror 20 may include a mirror (reflector), or the rear view mirror 20 may include a display unit or the like for presenting image information.

Since the interior space of the vehicle rear view device is small, in order to minimize the space occupied by the communication antenna, optionally, the shape of the communication antenna 32 matches the shape of the antenna placement area 100 of the shell 10. In other words, the shape of the communication antenna 32 matches the shape of the shell 10 at a position where the communication antenna 32 is placed. The communication antenna 32 can be a rigid antenna, for example a rigid PCB microstrip antenna. Alternatively, the communication antenna 32 can be a flexible antenna. Optionally, the communication antenna 32 may be a flexible antenna that is attached to the antenna placement area 100. When a flexible antenna is used as the communication antenna, the installation of the communication antenna in the shell is facilitated, and the space occupied by the communication antenna can be further reduced, which helps to ensure the overall size of the rear view mirror. Optionally, a flexible PCB microstrip antenna may be employed in the implementation. The communication antenna 32 can be directly attached to the antenna placement area 100.

Figure 2:
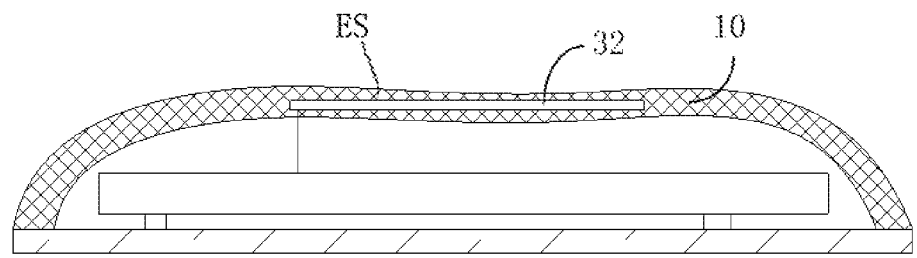
FIG. 2 is a cross-sectional structural view of another vehicle rear view device according to an embodiment of the present disclosure.

For some rigid antennas, or for the inner wall of the shell at a narrow position, it is difficult to perfectly attach the communication antenna to the inner wall of the shell. As shown in FIG. 2, in another embodiment provided in the present disclosure, the antenna placement area 100 includes an antenna embedding space ES located in the shell wall of the shell 10 (in other words, the antenna placement area 100 is located in the shell 10), and the communication antenna 32 is partially or wholly embedded in the antenna embedding space ES. Alternatively, the shell 10 may be integrally molded (e.g., injection molded) to the communication antenna 32 in the production process, so as to integrally form the shell 10 and the communication antenna 32. It simplifies the subsequent assembly process of the vehicle rear view device.

The wireless communication device 30 can change the structure of the communication antenna 32 for different types of communication modes and different application environments. The communication antenna 32 may be applied by such as a ceramic antenna, a whip antenna, an antenna array, or a smart antenna.

The communication type of the wireless communication device 30 is not limited to one certain type. Optionally, at least one of a satellite module, a cellular network module, a millimeter wave radar module, an FM broadcast module, a WiFi module, and a Bluetooth module may be disposed on the communication circuit board 31. Correspondingly, the communication antenna 32 may include at least one of a satellite antenna, a cellular network antenna, a millimeter wave radar antenna, an FM broadcast antenna, a WiFi antenna, and a Bluetooth antenna.

The satellite module can usually includes GPS, BeiDou or GLONASS, where the GPS frequencies are 1575.42 MHz and 1227.6 MHz, the frequency of the BeiDou is 1561.098 MHz, 1207.14 MHz and 1268.52 MHz, and the frequencies of GLONASS are 1602 MHz and 1246 MHz. The frequency bands of the millimeter wave radar module are 24 GHz, 77 GHz, 35 GHz, and 94 GHz. The frequency band of the FM broadcasting module is 87 MHz to 108 MHz. The frequency band of the WiFi module and the Bluetooth module is 2.4 GHz. The frequency band of the cellular network module is 825 MHz to 2400 MHz.

Figure 3:
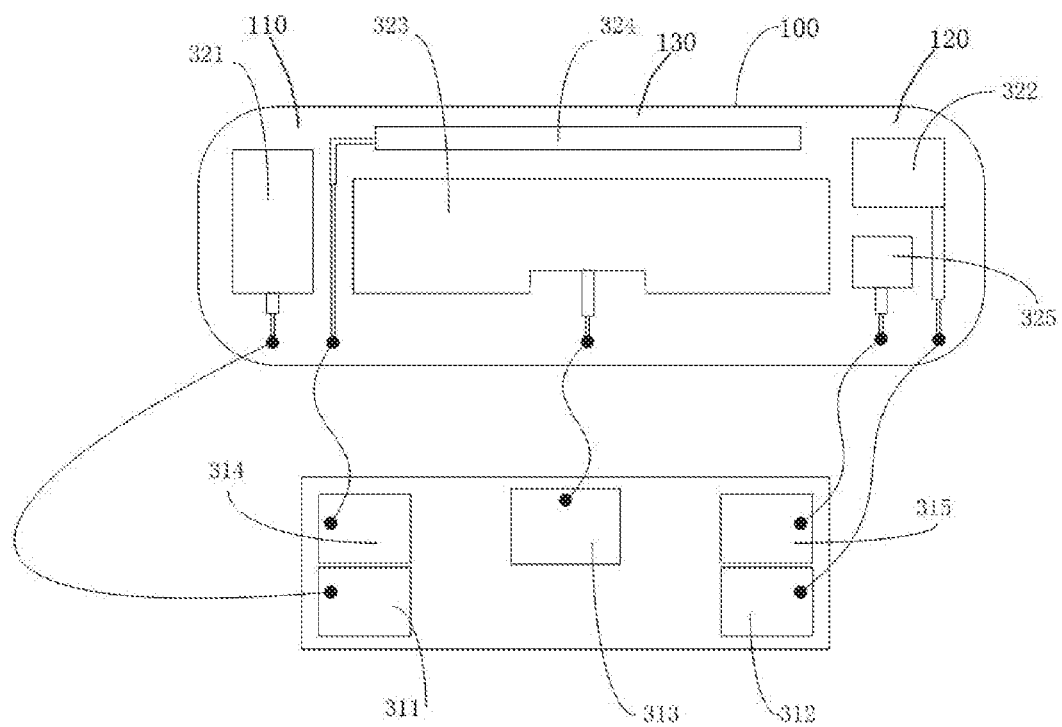
FIG. 3 is a schematic view of an arrangement structure of an internal communication antenna of a vehicle rear view device according to an embodiment of the present disclosure.

As shown in FIG. 3, in another embodiment provided in the present disclosure, in order to maintain better wireless communication quality in an environment of multi-antenna with different working frequency, optionally, the antenna placement area 100 includes a first end placement area 110 and a second end placement area 120 at two opposite ends of the shell 10 in a length direction of the shell 10. The communication antenna 32 includes the satellite antenna 321 and the cellular network antenna 322. The satellite antenna 321 is disposed in the first end placement area 110, and the cellular network antenna 322 is disposed in the second end placement area 120. Since the operating frequencies of the satellite antenna 321 and the cellular antenna 322 are similar, the two are placed on two sides (ends) of the shell 10 at a relatively distant position, thereby reducing signal interference between the satellite antenna 321 and the cellular antenna 322. The satellite antenna 321 is electrically connected to the satellite module 311, and the cellular network antenna 322 is electrically connected to the cellular network module 312.

Furthermore, the antenna placement area 100 includes a central placement area 130; the central placement area 130 is located between the first end placement area 110 and the second end placement area 120. The communication antenna 32 may include a millimeter wave radar antenna 323, and the millimeter wave radar antenna 323 is disposed in the central placement area 130. The millimeter wave radar antenna 323 adopts a microstrip array antenna with a large area, high operating frequency, short wavelength, strong anti-interference ability, and can be placed at the center position. The communication antenna 32 further includes an FM broadcast antenna 324, and the FM broadcast antenna 324 is disposed in the central placement area 130 separately. In other embodiments, since the frequency of the FM broadcast is low and the wavelength is long, the millimeter wave radar antenna and the FM broadcast antenna have less mutual interference. The communication antenna 32 may include: a millimeter wave radar antenna 323 and an FM broadcast antenna 324. The millimeter wave radar antenna 323 and the FM broadcast antenna 324 are disposed in the central placement area 130. The millimeter wave radar antenna 323 and the FM broadcast antenna 324 may be arranged in parallel. The millimeter wave radar antenna 323 is electrically connected to the millimeter wave radar module 313, and the FM broadcast antenna 324 is electrically connected to the FM broadcast module 314.

The WiFi antenna and the Bluetooth antenna mainly communicate with the electronic devices in the vehicle and can be disposed in a lower region of the antenna placement area 130. Optionally, the communication antenna 32 further includes: a WiFi antenna and/or a Bluetooth antenna 325, and the WiFi antenna and/or the Bluetooth antenna 325 are disposed in the second end placement area 120 (on a lower side of the cellular network antenna 322). The WiFi antenna is electrically connected to the WiFi module, and the Bluetooth antenna 325 is electrically connected to the Bluetooth module 315.

A vehicle, such as a fuel automobile, an electric vehicle, a hybrid vehicle, or the like, is provided in the embodiment of the present disclosure. Such vehicle includes the vehicle rear view device in the above embodiment.

Since the communication antenna in the vehicle rear view device does not need to separately arrange the antenna line in the vehicle, the vehicle is convenient to be assembled and the interior arrangement is simple. Meanwhile, since the communication antenna of the wireless communication device is disposed separately from the communication circuit board, it is not necessary to reserve a position on the communication circuit board for antenna installation, so that the size of the communication circuit board is small. Compared with arranging the communication antenna on the communication circuit board, the heat dissipation of the communication circuit board can be improved, the electromagnetic interference caused by the communication antenna to the communication circuit board can be reduced, and the wireless communication capability of the vehicle can be improved.

In the above embodiments, the descriptions of the various embodiments have their respective focuses. The parts that are not detailed in a certain embodiment can be referred to the related descriptions in other embodiments.

It will be appreciated that related features in the above described devices may be referred to each other. In addition, 'first', 'second', and the like in the above embodiments are used to distinguish different embodiments, and do not represent the advantages or disadvantages of the embodiments.

In the description provided herein, numerous specific details are set forth. However, it is understood that the embodiments of the present disclosure may be practiced without these specific details. In some instances, well-known structures and techniques are not shown in details so as not to obscure the description.

Similarly, in order to simplify the present disclosure and to facilitate an understanding to one or more of the various embodiments of the present disclosure, in the above description of the exemplary embodiments of the present disclosure, various features of the present disclosure are sometimes grouped together into a single embodiment, figure, or description thereof. However, the disclosed device should not be explained as reflecting the following intention: the claimed invention requires more features than those specifically recited in the appended claims. Therefore, the claims following the specific embodiments are hereby explicitly incorporated into the specific embodiments, and each of the claims should be considered as a separate embodiment of the present disclosure.

Those skilled in the art will appreciate that the components of the apparatus in an embodiment can be adaptively changed and applied in one or more apparatus (devices) of the other different embodiments. The components of the embodiment can be combined into one component and, in addition, those components can be divided into a plurality of sub-components. Except at least some of such features being mutually exclusive, all of the features (including the appended claims, the abstract and the drawings) and all components of the device disclosed in the specification may be combined. Each feature disclosed in the specification (including the appended claims, the abstract and the drawings) may be replaced by an alternative feature that provide the same, equivalent or similar purpose.

In addition, those skilled in the art will appreciate that, although some embodiments described herein include certain features (rather than other features) that are also included in other embodiments, combinations of features from different embodiments are intended to be within the scope of the present disclosure. Different embodiments are formed and formed. For example, in the appended claims, any one of the claimed embodiments can be applied in any combinations. Various components in embodiments of the present disclosure may be implemented in hardware or in a combination thereof.

It should be noted that the above described embodiments are illustrative for the present disclosure and are not intended to limit the scope of the present disclosure. Those skilled in the art can devise alternative embodiments without departing from the scope of the appended claims. In the claims, any reference signs placed in parentheses shall not be explained as a limitation. The word 'comprising' does not exclude the part or component which is not recited in the claims. The word 'a' or 'an' positioned preceding the recited part or component does not exclude the presence of a plurality of such parts or components. The present disclosure can be implemented by means of a device comprising several distinct components. In the claims enumerating several components, several of these components may be embodied by the same component item. The use of the words 'first', 'second', and 'third' does not indicate any order. These words may be interpreted as names.

The above description is only a preferred embodiment of the present disclosure, and is not intended to limit the present disclosure in any way. Any simple alternations, equivalent changes and modifications made to the above embodiments in accordance with the technical spirit of the present disclosure are still within the scope of the technical solution of the present disclosure.

The invention claimed is:
1. A vehicle rear view device comprising:
a shell;
a rear view mirror, and an accommodation space is formed between the shell and the rear view mirror;
a wireless communication device comprising a communication circuit board and a communication antenna;
wherein the communication circuit board is located in the accommodation space, the communication antenna is disposed in an antenna placement area of the shell, the communication antenna is disposed separately from the communication circuit board and connected to the communication circuit board by wires, and the communication antenna and the communication circuit board are electrically connected;
wherein the antenna placement area comprises a first end placement area and a second end placement area at two opposite ends of the shell in a length direction of the shell;
wherein the communication antenna comprises a satellite antenna and a cellular network antenna, the satellite antenna is disposed in the first end placement area, and the cellular network antenna is disposed in the second end placement area; and
wherein the communication antenna further comprises at least one of a millimeter wave radar antenna and a FM broadcast antenna, and the at least one of the millimeter wave radar antenna and the FM broadcast antenna is disposed in a central placement area.

2. The vehicle rear view device according to claim 1, wherein a shape of the communication antenna matches a shape of the antenna placement area of the shell.

3. The vehicle rear view device according to claim 1, wherein
the communication antenna is a flexible antenna, and the flexible antenna is attached to the antenna placement area.

4. The vehicle rear view device according to claim 3, wherein
the flexible antenna is a flexible PCB microstrip antenna.

5. The vehicle rear view device according to claim 1, wherein
the antenna placement area comprises an antenna embedding space located within a shell wall of the shell, and the communication antenna is partially or wholly embedded in the antenna embedding space.

6. The vehicle rear view device according to claim 5, wherein
the shell and the communication antenna are integrally formed.

7. The vehicle rear view device according to claim 1, wherein
the shell is detachably coupled to the rear view mirror in a snap-fit manner.

8. The vehicle rear view device according to claim 7, wherein
the communication circuit board is disposed on the rear view mirror.

9. The vehicle rear view device according to claim 7, wherein the rear view mirror is provided with a first docking end, the first docking end is electrically connected to the communication circuit board, and the shell is provided with a second docking end, the second docking end is electrically connected to the communication antenna;
the first docking end connects with the second docking end when the shell is coupled to the rear view mirror in the snap-fit manner; and the first docking end is separated from the second docking end when the shell is separated from the rear view mirror.

10. The vehicle rear view device according to claim 1, wherein the central placement area is located between the first end placement area and the second end placement area.

11. The vehicle rear view device according to claim 1, wherein the communication antenna further comprises at least one of a WiFi antenna and a Bluetooth antenna, and the at least one of the WiFi antenna and the Bluetooth antenna is disposed in the second end placement area.

12. A vehicle comprising the vehicle rear view device according to claim 1.

\* \* \* \* \*